(12) United States Patent
Howes et al.

(10) Patent No.: US 9,369,481 B2
(45) Date of Patent: Jun. 14, 2016

(54) INCIDENT TRIAGE ENGINE

(71) Applicant: Accenture Global Services Limited, Dublin (IE)

(72) Inventors: Joshua Z. Howes, Arlington, VA (US); Walid Negm, Finksburg, MD (US); James J. Solderitsch, Rosemont, PA (US); Ashish Jotwani, Alexandria, VA (US); Matthew Carver, Fairfax, VA (US)

(73) Assignee: Accenture Global Services Limited, Dublin (IE)

( * ) Notice: Subject to any disclaimer, the term of this patent is extended or adjusted under 35 U.S.C. 154(b) by 122 days.

(21) Appl. No.: 14/247,322

(22) Filed: Apr. 8, 2014

(65) Prior Publication Data

US 2014/0223567 A1    Aug. 7, 2014

Related U.S. Application Data

(62) Division of application No. 13/269,275, filed on Oct. 7, 2011, now Pat. No. 8,732,840.

(51) Int. Cl.
| | |
|---|---|
| *G06F 11/00* | (2006.01) |
| *H04L 29/06* | (2006.01) |
| *G06F 21/57* | (2013.01) |
| *G06Q 10/10* | (2012.01) |
| *G06F 21/55* | (2013.01) |

(52) U.S. Cl.
CPC .......... *H04L 63/1433* (2013.01); *G06F 21/554* (2013.01); *G06F 21/577* (2013.01); *G06Q 10/10* (2013.01); *H04L 63/1416* (2013.01)

(58) Field of Classification Search
CPC ............ H04L 63/1416; H04L 63/1433; G06F 21/554; G06F 21/577

USPC ......................... 726/22–24, 25; 713/187–188
See application file for complete search history.

(56) References Cited

U.S. PATENT DOCUMENTS

| | | | |
|---|---|---|---|
| 7,890,869 B1 | 2/2011 | Mayer et al. | |
| 8,132,260 B1 * | 3/2012 | Mayer ................... | G06F 21/577 726/11 |

(Continued)

OTHER PUBLICATIONS

Defense Advanced Research Projects Agency, DARPA Order No. J353 "Real-Time Evaluation of Cyber-Course of Action (COA) Impact on Performance & Effectiveness," AFRL-IF-RS-TR-2004-75, Final Technical Report, Mar. 2004, Approved for Public Release; Distribution Unlimited, 49 pages.

(Continued)

*Primary Examiner* — Samson Lemma
(74) *Attorney, Agent, or Firm* — Harrity & Harrity, LLP

(57) ABSTRACT

An incident triage engine performs incident triage in a system by prioritizing responses to incidents within the system. One prioritization method may include receiving attributes of incidents and assets in the system, generating cumulative loss forecasts for the incidents, and prioritizing the responses to the incidents based on the cumulative loss forecasts for the incidents. Another prioritization method may include determining different arrangements of incidents within a response queue, calculating cumulative queue loss forecasts for the different arrangements of incidents within the response queue, and arranging the incidents in the response queue based on the arrangement of incidents that minimizes the total loss to the system over the resolution of all of the incidents present in the response queue.

27 Claims, 11 Drawing Sheets

(56) References Cited

U.S. PATENT DOCUMENTS

| | | | |
|---|---|---|---|
| 8,220,056 B2 | 7/2012 | Owens, Jr. | |
| 8,407,317 B2 * | 3/2013 | Embree | G06F 11/0781 709/201 |
| 8,712,596 B2 * | 4/2014 | Scott | G06F 21/55 700/297 |
| 2004/0250122 A1 * | 12/2004 | Newton | H04L 63/1425 726/2 |
| 2006/0031938 A1 * | 2/2006 | Choi | G06F 21/552 726/25 |
| 2006/0212925 A1 * | 9/2006 | Shull | G06F 21/55 726/1 |
| 2007/0113281 A1 * | 5/2007 | Leach | G06Q 40/08 726/22 |
| 2007/0143851 A1 | 6/2007 | Nicodemus et al. | |
| 2007/0239496 A1 * | 10/2007 | Supatgiat | G06F 17/5009 703/2 |
| 2010/0275263 A1 * | 10/2010 | Bennett | G06F 21/577 726/25 |
| 2011/0173045 A1 * | 7/2011 | Jaine | G06Q 10/0635 705/7.28 |
| 2011/0239303 A1 | 9/2011 | Owens, Jr. | |
| 2012/0143650 A1 * | 6/2012 | Crowley | G06F 21/554 705/7.28 |
| 2013/0104236 A1 | 4/2013 | Ray et al. | |

OTHER PUBLICATIONS

Mica R. Endsley et al., "Theoretical Underpinnings of Situation Awareness: A Critical Review", (2000), Situation Awareness Analysis and Measurement, Lawrence Erlbaum Associates, 24 pages.

* cited by examiner

310

| Device | Confidentiality Value | Integrity Value | Availability Value | Defensive Value | Substitutability | Susceptibility |
|---|---|---|---|---|---|---|
| Unspecified | 0 | 0 | 0 | 0 | 0 | 1 |
| End point | 3 | 3 | 1 | 0 | 0 | 1 |
| Database Server | 7 | 7 | 7 | 0 | 0 | 1 |
| Application Server | 2 | 2 | 7 | 0 | 0 | 1 |
| Firewall | 0 | 5 | 5 | 9 | 0 | 1 |
| IDS | 0 | 5 | 5 | 9 | 0 | 1 |
| Router | 0 | 0 | 0 | 0 | 0 | 1 |
| Switch | 0 | 0 | 0 | 0 | 0 | 1 |
| Bridge | 0 | 0 | 0 | 0 | 0 | 1 |
| Repeater | 0 | 0 | 0 | 0 | 0 | 1 |
| DNS | 2 | 2 | 8 | 0 | 0 | 1 |
| NAT | 0 | 0 | 0 | 0 | 0 | 1 |
| Transformer Load | 0 | 9 | 0 | 0 | 0 | 1 |

320

| Attack | Confidentiality Impact | Integrity Impact | Availability Impact | Defense Impact | Incubation Period | Progression Speed | Potency | Transmission Mode | Latency Period |
|---|---|---|---|---|---|---|---|---|---|
| Unspecified | 0 | 0 | 0 | 0 | 0 | 1 | 0 | 0 | 0 |
| DoS (Reflector) | 0 | 0 | 1 | 0 | 0 | 1 | 0 | 0 | 0 |
| DoS (Amplifier) | 0 | 0 | 1 | 0 | 0 | 1 | 0 | 0 | 0 |
| DoS (Flood) | 0 | 0 | 1 | 0 | 0 | 1 | 0 | 0 | 0 |
| Virus | 1 | 1 | 0 | 0 | 0 | 1 | 0 | 0 | 0 |
| Worm | 1 | 1 | 0 | 0 | 0 | 1 | 1 | 0 | 0 |
| Trojan Horse | 1 | 1 | 0 | 0 | 0 | 1 | 0 | 0 | 0 |
| Malicious Mobile | 1 | 0 | 0 | 0 | 0 | 1 | 0 | 0 | 0 |
| Blended Attack | 0 | 0 | 0 | 0 | 0 | 1 | 0 | 0 | 0 |
| Tracking Cookies | 1 | 0 | 0 | 0 | 0 | 0 | 0 | 0 | 0 |
| Attacker Tools | 0 | 0 | 0 | 1 | 0 | 0 | 0 | 0 | 0 |

Fig. 3

INCIDENT TRIAGE ENGINE

This application is a division of application Ser. No. 13/269,275, filed Oct. 7, 2011, entitled INCIDENT TRIAGE ENGINE, the disclosure of which is incorporated herein by reference in its entirety.

This disclosure is directed to an incident triage engine in a security event management system, more particularly, this disclosure is directed to systems, methods and computer programs embodied on non-transitory computer readable media for triaging incidents in a system and prioritizing responses to the incidents.

BACKGROUND

Computer networks and network components are frequently the subject of various incidents that are detrimental to network performance. For example, incidents such as denial of service attacks, viruses, worms, Trojan horses, and other malicious software (malware) directed at a computer network can have a serious negative impact on the confidentiality, integrity, and availability of the computer network, network components, and data within the computer network. Incidents are not limited to digital incidents, and both digital and physical incidents can have serious impacts on both physical and digital assets within a network or, more broadly, a physical environment. These security incidents result in real losses of value for organizations. Accordingly, most network administrators implement some sort of security information and event management system to handle such security incidents.

A conventional security information and event management (SIEM) environment may include a security information and event management system that reports suspicious security events to a security analyst who then manually validates the veracity of the security event, manually registers the event into the corporate trouble ticketing system, and then proceeds to resolve or mitigate the security impact of the event. In some instances, the security analyst may enlist the help of other members of the security team.

The security analyst may use established guidelines for determining the appropriate response to the security event. The established guidelines may have been prepared beforehand by senior members of the security team, and may include procedures, best practices, checklists, etc. The support and interactions of the senior members of the security team and the security analyst are thus performed in an ad-hoc fashion, in that there may not be coordination and process management tools intrinsic to the environment. These tools may be built and used by the security team, senior management, and the IT organization using third party applications and services, which may be incompatible, overlapping, or have gaps in necessary services.

The ad hoc nature of the response may result in an inconsistent event management process where the time to resolve issues may be heavily dependent upon factors, such as the skill of the senior security team in forecasting likely event scenario, and the skill of the particular security analyst performing the resolution/mitigation efforts. The open loop nature of this conventional environment may require the senior security team members to manually analyze security event mitigation efforts to extract lessons-learned and process improvements. This manual process may practically eliminate the possibility of deriving consistent and reliable performance metrics.

In response to the above and other problems of conventional security and event management environments, some organizations have developed standardized workflows to facilitate the use of consistent security operating procedures in response to detected incidents, and the automation of standard actions. In practice, however, security events or incidents are not limited to single instances. Instead, multiple incidents may be pending resolution at any given time. However, organizations have limited resources available for responding to security events. Each resource allocated to respond to a specific security incident may be unavailable to respond to other concurrent incidents, or to even maintain day-to-day operations. The allocation of resources between incidents involves inherent tradeoffs. Thus, even if workflows are standardized and certain actions are automated, there remains the issue of prioritizing responses to multiple, overlapping incidents.

Accordingly, it is an object of embodiments of this disclosure to provide an incident triage engine. In some embodiments, the incident triage engine may tie security events and incidents to a set of loss algorithms to help prioritize responses to the incidents. These algorithms may evaluate the loss of an incident with respect to the resources required to respond, the time required to respond, and predicted loss of or damage to assets. The algorithms may also then prioritize responses to incidents based on a comparison of the respective losses due to the detected incidents. In some embodiment, the incident triage engine may be integrated with existing SIEM environments.

Another object of embodiments of this disclosure is to provide systems, methods and computer programs embodied on non-transitory computer readable media for triaging incidents in a system and prioritizing responses to the incidents.

SUMMARY

An embodiment of the disclosure relates to a method of prioritizing responses to a plurality of incidents within a system. The system may include a plurality of linked assets. Each incident of the plurality of incidents may be initially associated with an initial asset at an initial time. The method may be performed by a processor connected to a memory. The method may include: receiving attributes of the incidents and attributes of the assets; generating, for each incident, a cumulative loss forecast for the incident by: (1) calculating a first loss forecast for the incident with respect to the corresponding initial asset, the first loss forecast calculations being based on the attributes of the incidents and the attributes of the assets; (2) calculating additional loss forecasts for the incident with respect to each of the remaining assets of the plurality of assets, the additional loss forecasts being based on the attributes of the incidents, the attributes of the assets, and a time duration from the initial time to a time of incident inception at each of the remaining assets; and (3) calculating the cumulative loss forecast by combining the first loss forecast and the additional loss forecasts for the incident; and prioritizing the responses to the plurality of incidents based on the cumulative loss forecasts generated for each of the plurality of incidents.

In the method of the embodiment, the first loss forecast calculations may be further based on an incident impact over time on asset confidentiality loss model, an incident impact over time on asset integrity loss model, and an incident impact over time on asset availability loss model.

In the method of the embodiment, the receiving may further include receiving attributes of the system, the attributes of the system including an environmental factors attribute, and receiving attributes of courses of action to be taken as responses to the incidents. The attributes of the incidents may include one or more of the following: an incident morbidity attribute or an incident infectiousness attribute, where the incident morbidity attribute includes one or more of the following: a confidentiality impact of the incident, an integrity impact of the incident, an availability impact of the incident, a progression speed of the incident, or an incubation time of the incident, and where the incident infectiousness attribute includes one or more of the following: a potency of the incident, a transmission mode of the incident, or a latency period of the incident. The attributes of the assets may include one or more of the following: a value attribute or an immunity attribute, where the value attribute includes one or more of the following: a confidentiality value of the asset, an integrity value of the asset, an availability value of the asset, or a substitutability value of the asset, and where the immunity attribute includes a susceptibility value of the asset. The first loss forecast calculations may be further based on the attributes of the system and the attributes of the courses of action, and the additional loss forecast calculations may be further based on the potency of the incident, the transmission mode of the incident, and the latency period of the incident.

In the method of the embodiment, the receiving, generating, and prioritizing may be repeated after one or more of the following: a new incident entering the system, or an existing incident in the system being resolved.

In the method of the embodiment, the system may be a computer network, the plurality of linked assets may include one or more of the following: a database server, an application server, a firewall, an intrusion detection system, a router, a switch, a bridge, a repeater, or an end point; and the incidents may include one or more of the following: a denial of service attack, a virus, a worm, a trojan horse, a backdoor, or a cookie tracker.

Another embodiment of the disclosure relates to a method of prioritizing responses to a plurality of incidents within a system. The method may be performed by a processor connected to a memory. The method may include: determining a plurality of different arrangements of the incidents within a response queue; calculating, for the plurality of different arrangements of the incidents within the response queue, a cumulative queue loss forecast based on the arrangement of the incidents within the response queue; and arranging the order of the incidents within the response queue according to the arrangement of the incidents within the response queue with the smallest cumulative queue loss forecast.

In the method of the embodiment, the plurality of different arrangements of the incidents within the response queue may include all possible arrangements of the incidents within the response queue.

The method of the embodiment may also include receiving, for each incident, a remediation time attribute based on the course of action associated with the incident. Each incident may be associated with a course of action for resolving the incident, and the calculating may further include, for each of the incidents, calculating a loss forecast based on a total time to resolve the incident, the total time to resolve the incident being based on sum of the remediation time of the incident plus the remediation times of all of the incidents at an earlier position in the queue. The cumulative queue loss forecast may be the sum of the loss forecasts calculated for each of the incidents.

In the method of the embodiment, machine learning may be used to associate each incident with the course of action for resolving the incident.

The method of the embodiment may also include, after arranging the order of the incidents within the response queue, executing the course of action associated with the incident arranged first in the response queue.

In the method of the embodiment, the receiving may further include receiving attributes of the system, attributes of assets within the system, and attributes of the incidents. The determining, calculating, arranging and receiving may be continuously performed, and the calculating may be performed based on most recently received attributes of the courses of action and most recently received attributes of the assets and systems.

In the method of the embodiment, the attributes of the system may include an environmental factors attribute; the attributes of the incidents may one or more of the following: an incident morbidity attribute or an incident infectiousness attribute, where the incident morbidity attribute includes one or more of the following: a confidentiality impact of the incident, an integrity impact of the incident, an availability impact of the incident, a progression speed of the incident, or an incubation time of the incident, and where the incident infectiousness attribute includes one or more of the following: a potency of the incident, a transmission mode of the incident, or a latency period of the incident; and the attributes of the assets may include one or more of the following: a value attribute or an immunity attribute, where the value attribute includes one or more of the following: a confidentiality value of the asset, an integrity value of the asset, an availability value of the asset, or a substitutability value of the asset, and where the immunity attribute includes a susceptibility value of the asset.

In the method of the embodiment, the determining, calculating and arranging may be repeated after one or more of the following: an incident being added to the queue, or an incident being removed from the queue.

In the method of the embodiment, the system may be a computer network, the plurality of linked assets may include one or more of the following: a database server, an application server, a firewall, an intrusion detection system, a router, a switch, a bridge, a repeater, or an end point; and the incidents may include one or more of the following: a denial of service attack, a virus, a worm, a trojan horse, a backdoor, or a cookie tracker.

The methods of the embodiments of the disclosure may also be implemented in a system that includes a processor and a memory. Additionally, the methods of the embodiments may be included in a computer program embodied in non-transitory computer readable storage media.

Additional objects and advantages of the embodiments of the disclosure will be set forth in part in the description which follows, and in part will be obvious from the description, or may be learned by practice of the embodiments of the disclosure. The objects and advantages of the embodiments of the disclosure may be realized and attained by means of the elements and combinations particularly pointed out in the appended claims.

It is to be understood that both the foregoing general description and the following detailed description are exemplary and explanatory only and are not restrictive of the embodiments of the disclosure, as claimed.

The accompanying drawings, which are incorporated in and constitute a part of this specification, illustrate embodiments of the disclosure and, together with the description, serve to explain the principles of the embodiments of the disclosure.

BRIEF DESCRIPTION OF THE DRAWINGS

FIG. 3 is an example of different attribute values in a system.

DESCRIPTION OF EXEMPLARY EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
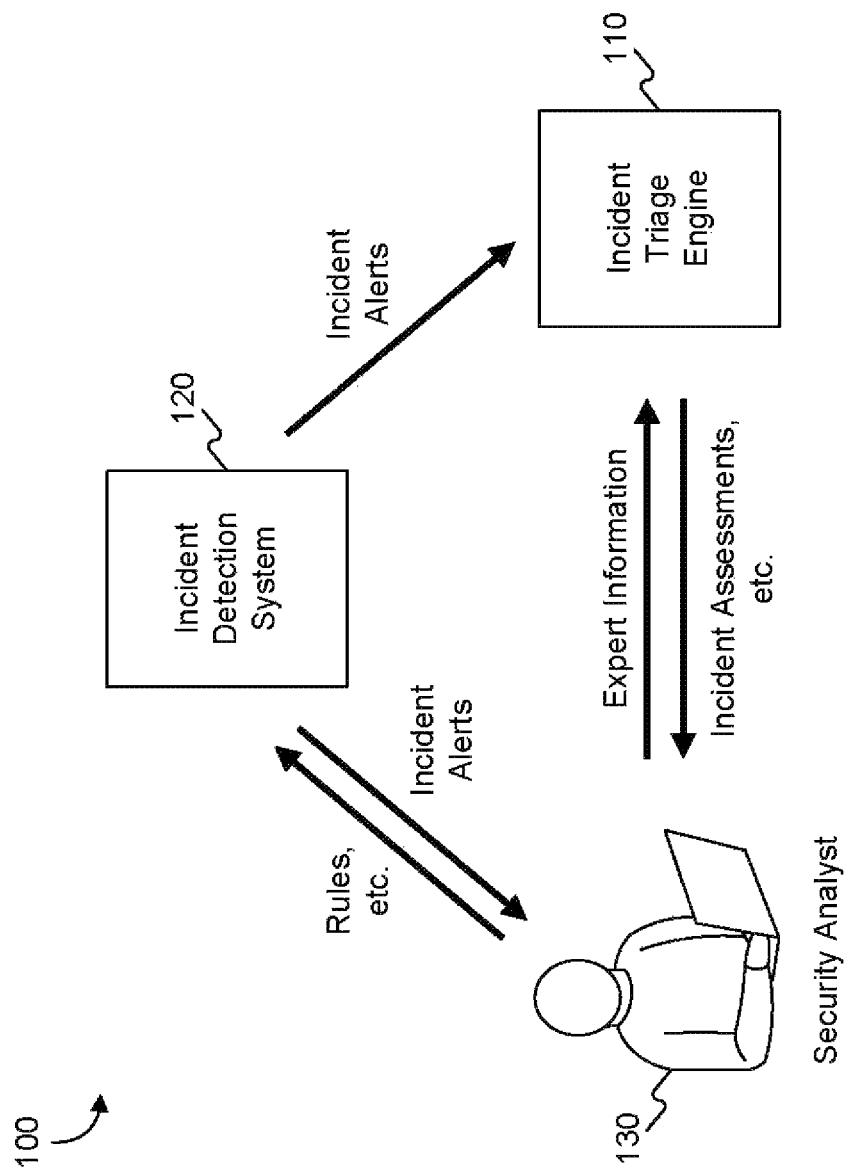
FIG. 1 is an illustration of an incident triage engine incorporated into an incident remediation system.

FIG. 1 illustrates an exemplary incident remediation system 100, incorporating an incident triage engine 110. In the incident remediation system 100, an incident detection system 120 detects and reports incidents to both the incident triage engine 110 and a security analyst 130. The security analyst 130 may provide information to the incident detection system, such as rules or configuration information, and may also provide expert information to the incident triage engine 110. The incident triage engine 110 provides information to the security analyst 130, such as, for example, incident assessments, course-of-action recommendations, and prioritization evaluations.

Figure 2:
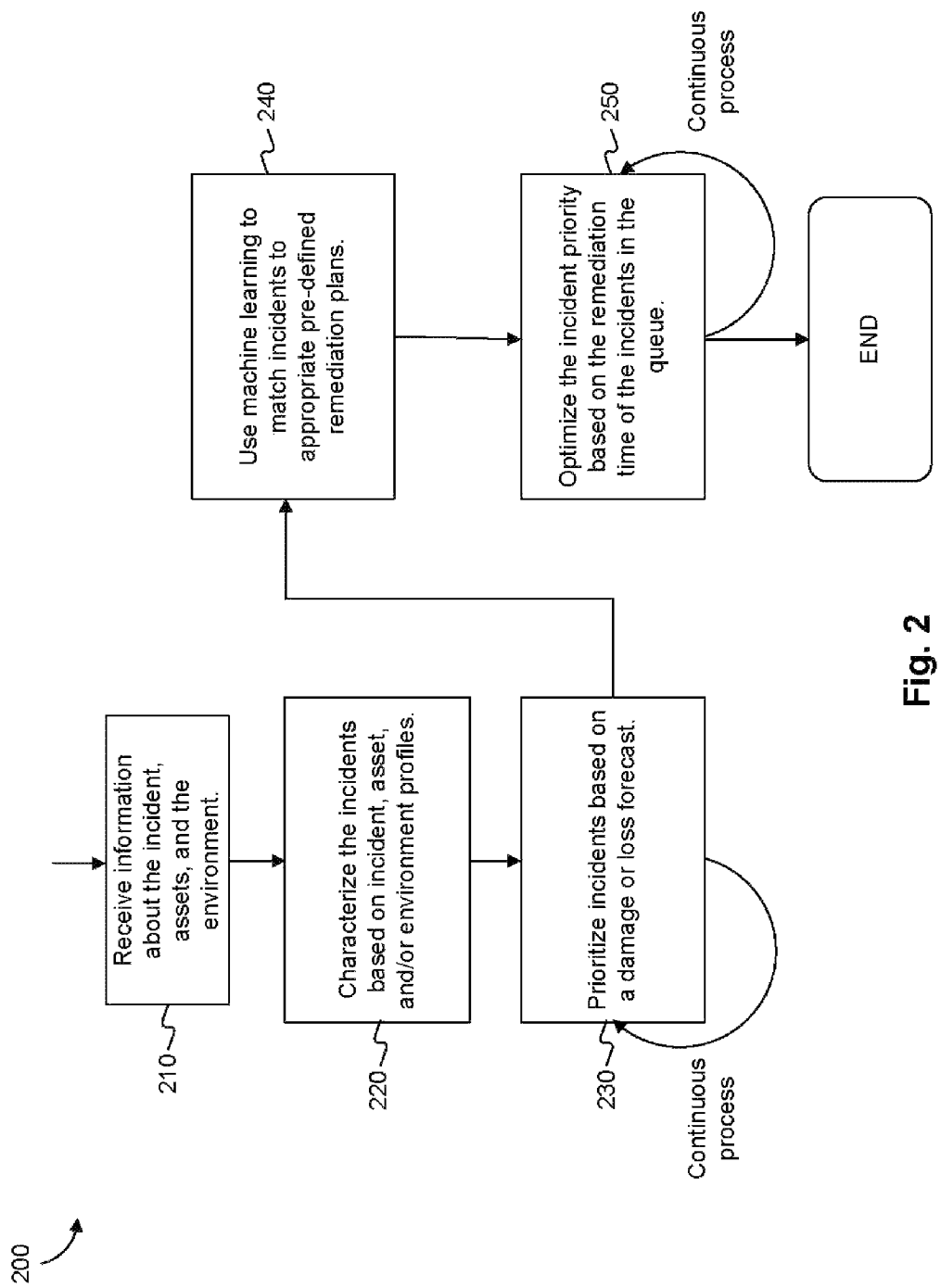
FIG. 2 is a flowchart showing the process of an incident triage engine of an embodiment.

FIG. 2 illustrates a flowchart 200 for an exemplary triage process performed by the incident triage engine of an exemplary embodiment.

In step 210, the incident triage engine receives information about the incident, assets, and the environment of the system to be protected. Operation of the method may then proceed to step 220. In step 220, the incident triage engine may characterize the incidents based on incident, asset, and/or environment profiles. Operation of the method may then proceed to step 230. In step 230, the incident triage engine prioritizes incidents based on a damage or loss forecast. Operation of the method may then proceed to step 240. In step 240, the incident triage engine may use machine learning to match incidents to appropriate pre-defined remediation plans. Operation of the method may then proceed to step 250. In step 250, the incident triage engine optimizes the incident priority based on the remediation time of the incidents in the queue. Each of these steps is described in greater detail below.

In step 210, the incident triage engine may receive as input information identifying one or more incidents, assets, and/or the environment of the system to be protected. In an exemplary embodiment, the system may be a computer network, and the assets may include components of the computer network such as, for example, a computer, stored data, a firewall, an intrusion detection system, a router, a switch, a bridge, a repeater, an end point, or the like. The incident may include, for example, a threat to the network, an attack on the network, and/or another security event, such as a denial of service attack, a virus, a worm, a trojan horse, a backdoor, and/or a cookie tracker. Other types of assets and incidents will be apparent to those skilled in the art. For example, in other embodiments, the assets may include physical assets in addition to digital assets, or the incidents may include physical intrusions in addition to digital intrusions. Physical assets may include buildings, materials, communication lines, power lines, utilities, etc.

In step 220, the incident triage engine may characterize the incidents based on incident, asset, and environment profiles. The incidents may also be characterized by a security analyst, or by a combination of the incident triage engine and a security analyst.

The incident profile may include data relating to the ability of the incident to affect the value of assets in the system in relation to confidentiality, integrity, and availability. The incident profile may also include data relating to the ability of the incident to spread to other assets in the system.

The ability of the incident to affect the value of assets in the system may be referred to as the morbidity attribute. The morbidity attribute may include a confidentiality impact, an integrity impact, an availability impact, a progression speed, and/or an incubation period of the incident. The confidentiality impact refers to the maximum impact the incident may have on the confidentiality value of an asset as a proportion of the total value of the asset. The integrity impact refers to the maximum impact the incident may have on the integrity value of an asset as a proportion of the total value of the asset. The availability impact refers to the maximum impact the incident may have on the availability value of an asset as a proportion of the total value of the asset. The progression speed refers to the rate at which the incident takes full effect on an asset. The incubation period refers to the amount of time between the inception of the incident and when the effect of the incident begins to occur.

The ability of the incident to spread to other assets in the system may be referred to as its infectiousness attribute. The infectiousness attribute may include a potency, transmission mode, and latency period of the incident. The potency of the incident refers to the likelihood that an incident will infect another asset. The transmission mode of the incident refers to the capability of the incident to move between assets in the system. The latency period of the incident refers to the amount of time before the incident begins threatening other assets in the system.

The asset profile may include data relating to the value of the asset and the immunity of the asset. The value of the asset refers to the importance of the asset to the operation of the system, and may include a confidentiality value, an integrity value, an availability value, a defensive value, and a substitutability value. The confidentiality value refers to the importance of confidentiality for the asset. The integrity value refers to the importance of integrity for the asset. The availability value refers to the importance of availability for the asset. The defensive value refers to the defensive value of the asset to the security of other assets in the system. The substitutability value refers to the potential for other assets to fulfill the role played by the asset.

The immunity of the asset refers to the resilience of the asset to an incident, and may include a susceptibility value. The susceptibility value refers to the capability of the asset to limit the impact of an incident.

The environment profile may include data relating to the ability of the environment to limit the spread of incidents to other assets in the environment. Specifically, the environment profile may include a durability attribute. The durability attribute refers to strength of the defenses on the links between assets in the environment.

FIG. 3 illustrates the different attribute values in an exemplary system according to one embodiment of the disclosure. Table 310 illustrates exemplary attribute values for assets in such a system. As illustrated in table 310, a database server may have high confidentiality, integrity, and availability values because the database stores valuable information, while a firewall may have a very high defensive value because the firewall provides a strong defense for the system. The values of each asset may be determined based on organizational requirements and may be adjusted to reflect the business value of an asset for the organization. For example, the website of a business whose primary service is e-commerce would most likely value the availability of a web server that allows customers to access their virtual storefront more than a company whose web server hosts information that is not critical to their business objectives. As another example, certain components of a power distribution system may be given high integrity values. If an incident were to compromises load values, e.g., of a transformer, there could be a catastrophic failure when power output levels are adjusted. Thus, such components may be assigned a high integrity value.

Table 320 illustrates an example of different attribute values for incidents in a system. For example, as illustrated in table 320, a denial of service incident may have low confidentiality impact and integrity impact values, but a high availability impact value, representing the nature of a denial of service attack. In contrast, a virus may have high confidentiality impact and integrity impact values, but a lower availability impact value. Incidents may have different impact attributes based on both the sophistication of the attacker and the innate nature of the threat. For example, a computer virus that is designed to delete sensitive files on a company's file system would most likely be considered to be more dangerous than a computer virus that only affects an individual users ability to access a word processing application. The various attribute values may be pre-loaded in the incident triage engine, may be entered or adjusted by a security analyst, or may be automatically adjusted through machine learning by the incident triage engine during use.

For example, a web server supporting an e-commerce website could be assigned high confidentiality, integrity, and availability values. The high confidentiality value may be based on the web server's storage of customer information, including credit cards and other sensitive personal information. The high integrity value may be based on the need to prevent manipulation of prices or charges. The high availability value may be based on the fact that no sales can take place when the website is down, and thus the business may be directly and immediately harmed if the web server were to become unavailable. To the extent that there is a redundancy in the system (e.g., if the e-commerce website were hosted on multiple, independent servers) then the availability value may be reduced. Such redundancy may have no effect on the confidentiality or integrity values.

In this example of a web server supporting an e-commerce website, a denial-of-service incident might have a high impact on availability, but a low impact on confidentiality and integrity. Alternatively, a remote exploit incident may have a high impact on confidentiality and integrity, but a low impact on availability. Thus, if both a denial of service incident and a remote exploit incident are detected, the triage engine may prioritize the remote exploit over the denial of service incident because the remote exploit may be considered to impact more critical aspects of the web server's value.

In step 230 of FIG. 2, the incident triage engine may prioritize incidents based on a damage or loss forecast. The process of prioritizing is described in detail below.

Figure 4:
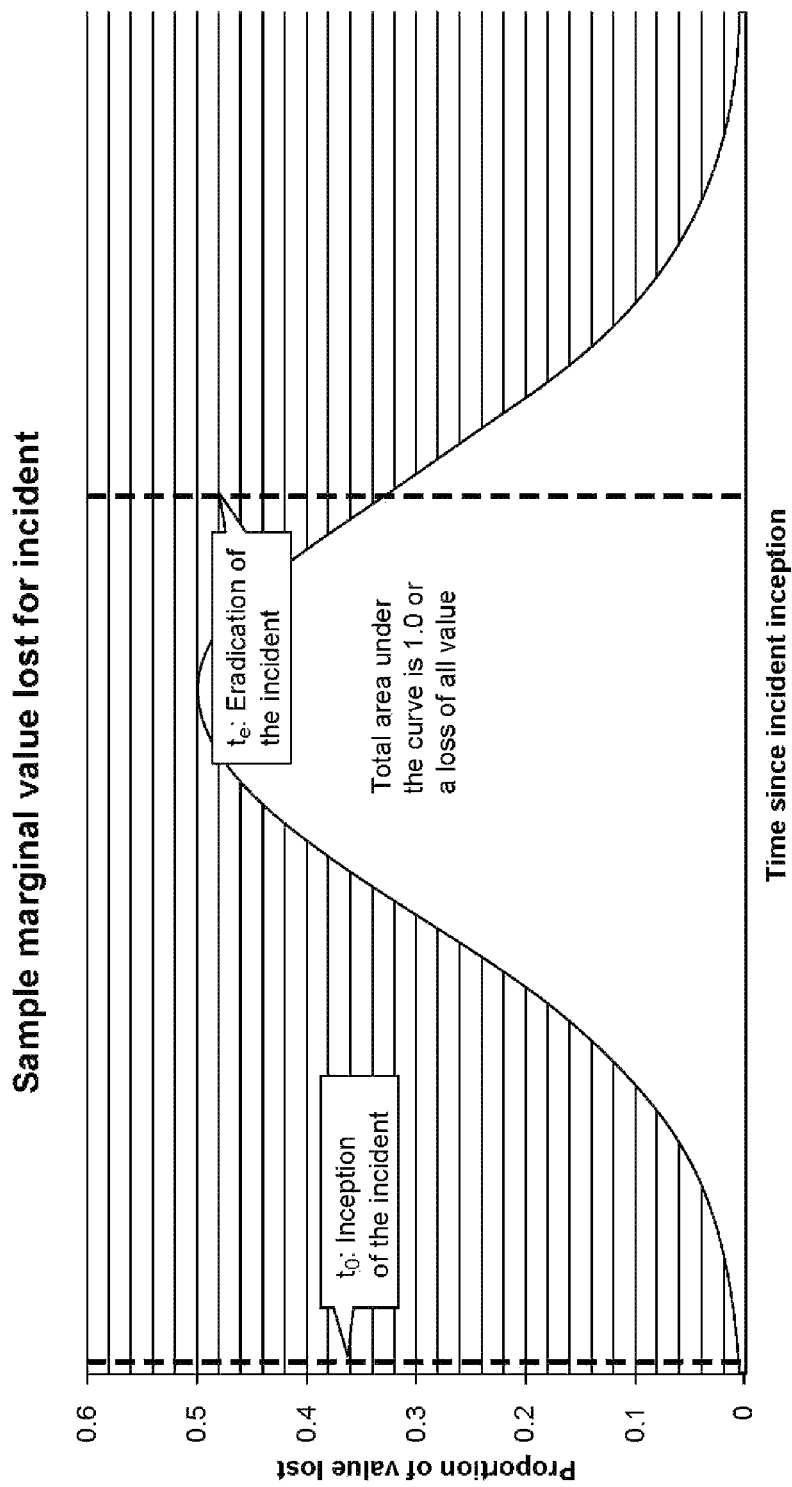
FIG. 4 is an exemplary graph of the marginal value lost during an incident.

FIG. 4 illustrates an example graph of the marginal value lost during an incident. The marginal value lost during an incident for both individual assets and the totality of the assets in the system can be important in calculating a damage or loss forecast.

In FIG. 4, time $t_0$ represents the inception of the incident. Time $t_e$ represents the eradication of the incident. The total area under the curve is equivalent to 100% of the value of the asset. The area under the curve from $t_0$ to $t_e$ represents the proportion of the asset value lost as a result of the incident.

Although FIG. 4 generically illustrates a marginal value lost for an incident, it should be noted that the graph of the marginal value lost may vary based on the characteristics of the incident, asset, and environment. For example, an asset for which availability is very important may suffer greater losses from, and/or suffer such losses more quickly from an incident with a high availability-impact rating than from an incident with a low availability-impact rating. Also, the marginal value lost for an asset may vary over the lifetime of the incident.

Figure 5A:
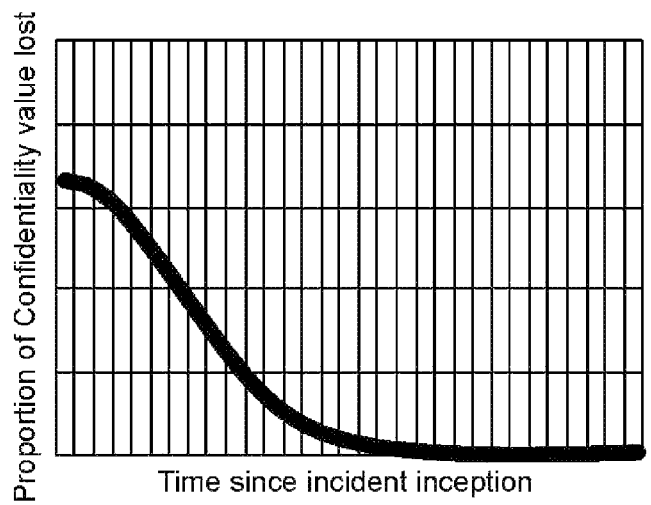
FIGS. 5a-c are exemplary graphs of the marginal value lost during an incident as measured by individual component losses due to the impact on metrics of confidentiality, integrity, and availability.
Figure 5B:
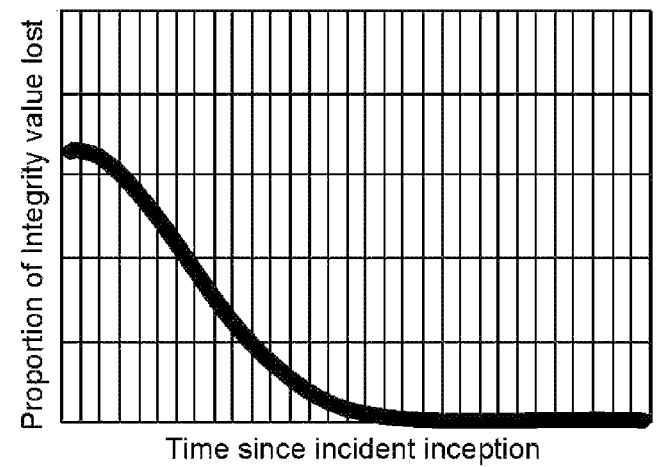
Figure 5C:
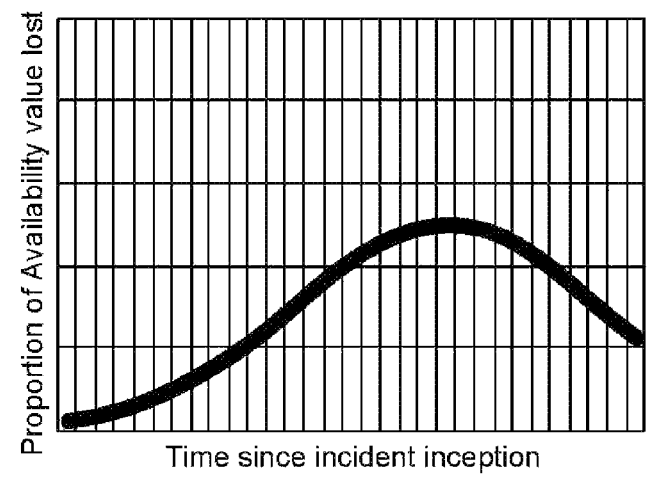

FIGS. 5a-c illustrate exemplary graphs of the marginal value lost during an incident as measured by individual component losses of the marginal value lost due to the impact on each of the confidentiality, integrity, and availability values. One of ordinary skill in the art will recognize that the marginal value graphs may have different shapes for different assets in different systems.

FIG. 5a illustrates the marginal value lost as measured by the impact on confidentiality. As seen in FIG. 5a, the marginal loss may be greater initially, with the marginal loss decreasing over time. This is because it is often impossible to regain confidentiality once it has been compromised. For example, if confidential data is stolen from an asset in the environment, even after the incident is eradicated and fully resolved, the confidentiality of the data has still been lost. Thus, for assets whose value subsists in their confidentiality, a breach of that confidentiality may result in the immediate loss of most of the asset's value.

FIG. 5b illustrates the marginal value lost as measured by the impact on integrity. As seen in FIG. 5b, the marginal loss may be greater initially, with the marginal loss decreasing over time. This is because attacks on the integrity of an asset often have the greatest impact at the onset of the incident.

FIG. 5c illustrates the marginal value lost as measured by the impact on availability. As seen in FIG. 5c, the marginal loss may be lower initially, with the marginal loss increasing over time. This is because a loss of availability often does not have as immediate an effect on an asset as a loss of confidentiality or integrity. For example, a denial of service attack on a web server may have relatively little impact if it only prevents access for a short period of time, e.g., a few minutes or hours. However, as the length of the outage increases, the marginal loss also increases.

The incident triage engine according to certain embodiments may include an incident loss forecast generator. An example of an incident loss forecast generator is illustrated in FIG. 6.

Figure 6:
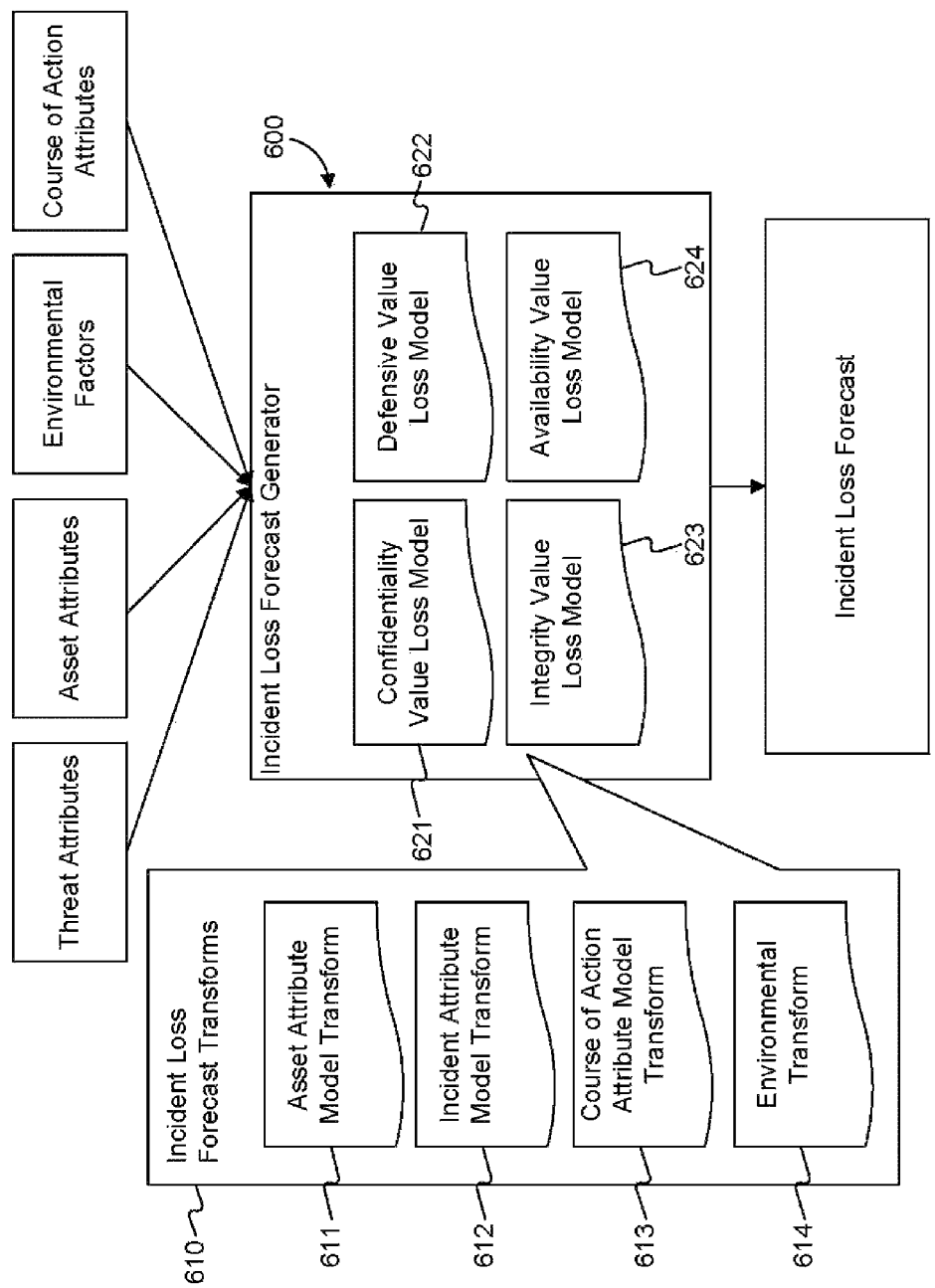
FIG. 6 is an example of an incident loss forecast generator.

As illustrated in FIG. 6, the incident loss forecast generator 600 may receive information about the incident attributes, the asset attributes, the environmental factors, and/or course-of-action attributes. Using incident loss forecast transforms 610, including an asset attribute model transform 611, an incident attribute model transform 612, a course-of-action attribute model transform 613, and/or an environmental transform 614, the incident loss forecast generator 600 generates a confidentiality value loss model 621, a defensive value loss model 622, an integrity value loss model 623, and/or an availability value loss model 624. Examples of the confidentiality value loss model, integrity value loss model, and availability value loss model are described above with respect to FIGS. 5*a*-*c*.

Using the various loss models, the incident loss forecast generator 600 may generate incident loss forecasts for incidents in the environment. An incident loss forecast may be generated for each incident in the system. A method for generating the loss forecast for an incident may include first calculating a loss forecast for the incident based on the initially infected asset, and then calculating additional loss forecasts for other assets in the environment based on the spread of the incident to the other assets.

The loss forecast for an incident with respect to an individual asset may be based on the input received by the incident loss forecast generator. In an embodiment, the loss forecast may be calculated by first determining a marginal loss forecast, then taking the integral of the marginal loss forecast to determine the total loss forecast. In an exemplary system, the following formula may be used to calculate a marginal incident loss forecast for an individual asset:

$$LA(t)=C(tP-N)V_C I_C+I(tP-N)V_I I_I(1-S)+A(tP-N)V_A I_A (1-S) \quad (1)$$

where:
 LA(t) represents the marginal loss from the incident at time t;
 C(t) represents the confidentiality loss model;
 I(t) represents the integrity loss model;
 A(t) represents the availability loss model;
 $V_C$ represents the asset confidentiality value;
 $V_I$ represents the asset integrity value;
 $V_A$ represents the asset availability value;
 $I_C$ represents the incident impact on confidentiality;
 $I_I$ represents the incident impact on integrity;
 $I_A$ represents the incident impact on availability;
 N represents the incubation period;
 P represents the progression speed; and
 S represents the substitutability.

As seen from the above equation (1), the marginal loss from the incident may be based on the sum of the confidentiality loss, the integrity loss, and the availability loss.

The confidentiality loss, in turn, may be based on the confidentiality loss model, multiplied by the product of the asset confidentiality value and the incident confidentiality impact. Note that the confidentiality loss value may also be affected by the potential delay in loss due to the progression speed and incubation of the incident.

The integrity loss may be based on the integrity loss model, multiplied by the product of the asset integrity value and the incident integrity impact. The integrity loss value may also be affected by the potential delay in loss due to the progression speed and incubation of the incident. Unlike the confidentiality loss, the integrity loss may be further affected by the substitutability of the asset.

The availability loss may be based on the availability loss model, multiplied by the product of the asset availability value and the incident availability impact. Similar to the integrity loss, the availability loss value may be affected by the potential delay in loss due to the progression speed and incubation of the incident, as well as the substitutability of the asset.

After calculating a loss forecast for the incident based on the initially infected asset, the method for generating the loss forecast for an incident may then calculate additional loss forecasts for the other assets in the system based on the spread of the incident to the other assets in the system. For example, after infecting the initial asset, the incident may travel to a linked asset and infect the new asset. The loss to the newly infected asset, in combination with the loss to the initially infected asset, increases the total loss forecast for the incident. An exemplary illustration of the spread of incidents to assets in a system is illustrated in FIG. 7.

Figure 7:
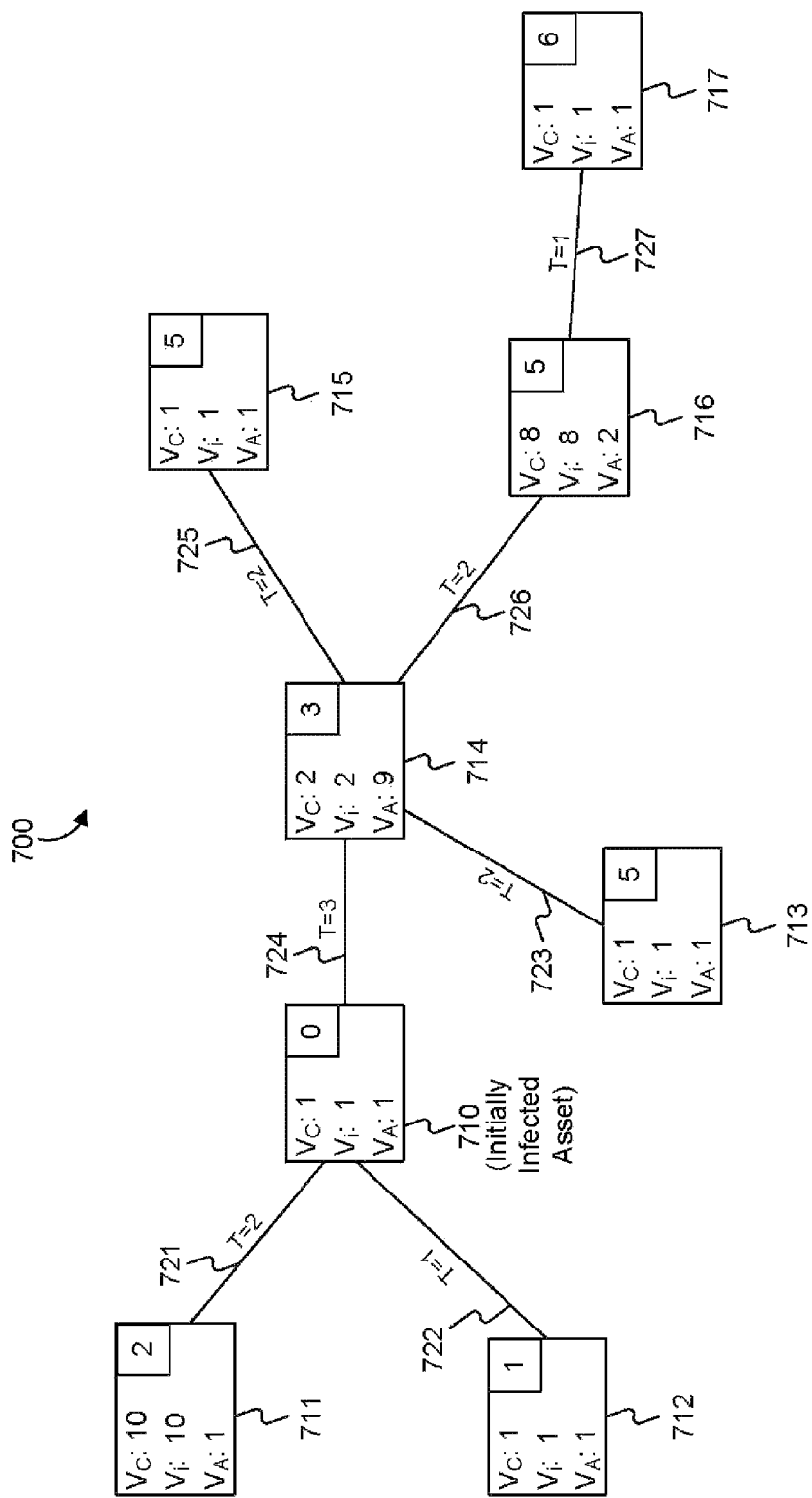
FIG. 7 illustrates the spread of an incident through the system.

FIG. 7 illustrates the spread of an exemplary incident through a system 700 according to one embodiment of the disclosure. The system 700 may include assets 710-717, which may be linked together. The asset confidentiality, integrity, and availability values are also illustrated for each asset 710-717.

The exemplary incident travels from one asset to another along links 721-727 between assets 710-717. The labels T=2, etc., along the links 721-727 between assets 710-717 indicate the time point for a failure of the defense along the link. For example, a link labeled T=2 may fail after 2 time units, at which point the incident may spread along the link and the next asset may become infected. The number in the upper right of each box representing the assets 710-717 indicates the total time elapsed before the asset may be infected (assuming zero latency).

The marginal loss that would be suffered by each of the remaining assets if they were to be affected by the exemplary incident may be calculated in the same manner as the marginal loss suffered by the initially infected asset, with the exception that time of inception of the incident will typically be later for the other assets, based in part on the incubation and latency of the incident.

The total or cumulative marginal loss forecast for an incident, with respect to all of the assets in the environment, may be calculated as follows:

$$LT(t)=LA(t_1)_1+pLA(t_2)_2+pLA(t_3)_3+\ldots+pLA(t_i)_i \quad (2)$$

where:
 LT(t) represents the cumulative marginal loss forecast for an incident;
 i represents the asset number in order of infection;
 $LA(t)_i$ represents the marginal loss to the asset i from the incident at time $t_i$;
 $t_i$ represents the time of incident inception at asset i; and
 p represents the incident potency.

In the above equation (2), the time of incident inception at asset i ($t_i$) may be dependent on the transmission mode of the incident. Specifically, if the transmission mode is a sequential transmission mode, then $t_i=t_1-(i-1)L$; while if the transmission mode is a simultaneous transmission mode, then $t_i=t_1-L$, where L represents the latency period. This represents the fact that, in a sequential transmission mode, the latency L may accumulate from the initially infected asset, and through each subsequent asset prior to inception at the current asset.

After determining the cumulative marginal loss forecast for an incident, the total or cumulative loss forecast can be calculated by taking the integral of the marginal loss forecast from the time of evaluation, as illustrated in the following equation:

$$\text{Total Forecasted Loss}=\int_a^\infty LT(t)dt \quad (3)$$

where LT(t) represents the cumulative marginal loss forecast; and
 a represents the time of evaluation.

The total or cumulative loss forecast for each additional incident affecting the environment can be calculated in the same manner as discussed above.

As illustrated in FIG. 2, after calculating a total or cumulative loss forecast for each incident, the incidents may be prioritized within the system (Step 230). As illustrated in FIG. 2, the prioritizing of the incidents may be carried out continuously. It should be noted that, for some implementations, a total or cumulative loss forecast may not need to be calculated for each incident in the system. For example, if similar incidents are present in the system, the total or cumulative loss forecast for one incident may be applied to another incident without directly calculating the total or cumulative loss forecast for the other incident. It should be noted that the method of step 230 can be executed without regard to specific courses of action or course-of-action characteristics.

The system may include a queue of incidents that have been detected or reported. The incident resolution queue may be part of the incident triage engine, or may be separate from the incident triage engine. If the incident resolution queue is separate from the incident triage engine, the incident triage engine may receive information from the incident resolution queue regarding the incidents in the incident resolution queue.

Figure 8:
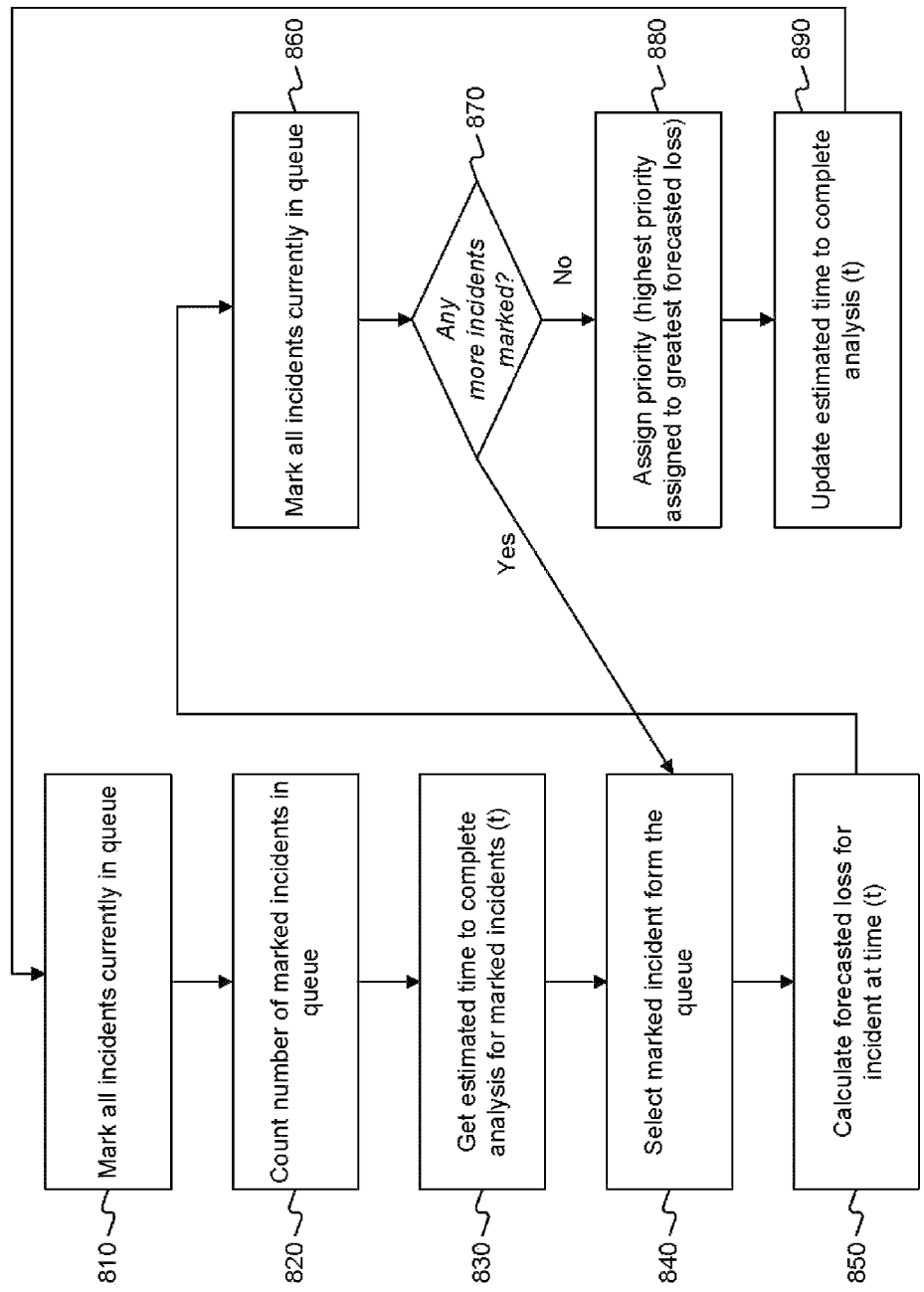
FIG. 8 is a flowchart showing the continuous prioritization based on a damage or loss forecast.

In step 810 of FIG. 8, all of the incidents in the queue may be marked. The method may then proceed to step 820, where the number of marked incidents in the queue may be counted. Operation of the method may then proceed to step 830, where an estimated time to complete analysis for the marked incidents may be determined. The estimated time when the analysis may be complete is represented by (t) in FIG. 8. Operation of the method may then proceed to step 840, where a marked incident may be selected from the queue. Operation of the method may then proceed to step 850.

In step 850, the cumulative loss forecast may be calculated for the selected incident. The forecast may be calculated based on the estimated time of completion of the analysis (t). After calculating the cumulative loss forecast for the selected incident, the method proceeds to step 860 where the selected incident may be unmarked in the queue. Operation of the method may then proceed to step 870, where it may be determined whether there are any more marked incidents in the queue. If there are remaining marked incidents within the queue, operation of the method may then return to step 840, where another marked incident may be selected from the queue, and operation of the method may continue as described above. If there are no remaining marked incidents within the queue at step 870, operation of the method may proceed to step 880, where the incidents may be prioritized within the queue. The order of the incidents within the queue may be determined based on the loss forecast for each incident, where the incident with the greatest loss forecast may receive the highest priority, and the remaining incidents may follow in priority based on the respective loss forecasts of the incidents, until the incident with the least loss forecast receives the lowest priority within the queue.

Operation of the method may then proceed to step 890, where the estimated time to complete the analysis (t) may be updated. Specifically, the system may measure and track the time it takes to complete the analysis of the incidents within the queue for the most recent iteration of the method, as well as for previous iterations, and update the estimated time to complete the analysis (t) based on the actual time to complete the analysis for one or more of the previous iterations of the method.

Upon completion of step 890, operation of the method then returns to step 810, where the method may be repeated. This repetition of the method illustrated in FIG. 8 is also illustrated in step 230 of FIG. 2.

Figure 9:
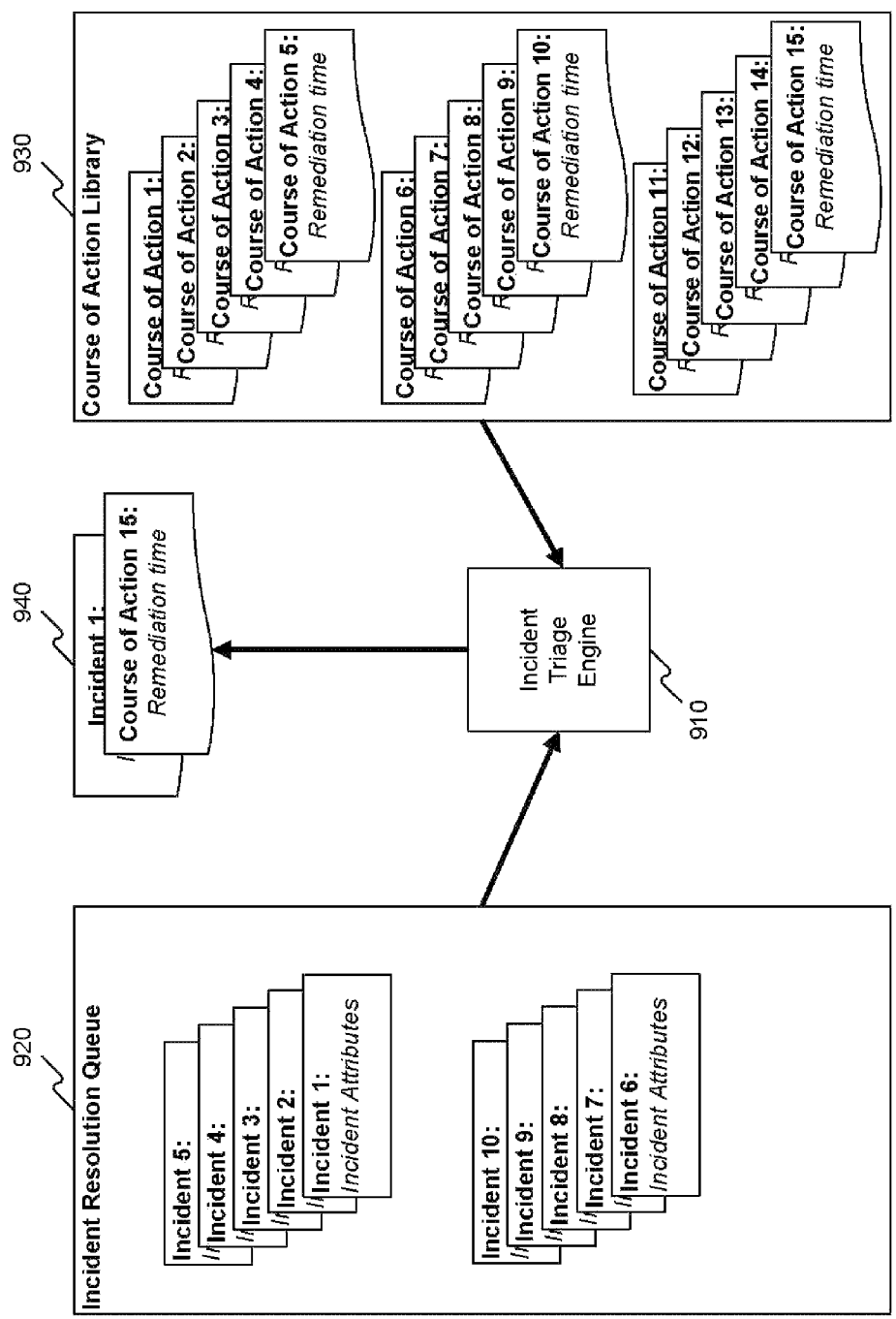
FIG. 9 illustrates the matching of incidents and courses of action according to an embodiment.

As illustrated in FIG. 9, the incident triage engine 910 may receive information from the incident resolution queue 920 regarding the incidents and incident attributes. The incident triage engine 910 may also receive information from a course-of-action library 930 regarding various courses of action for resolving incidents, including the estimated remediation time for the courses of action. Based on the information received from the incident resolution queue 920 and the course-of-action library 930, the incident triage engine 910 may match the incidents in the incident resolution queue 920 with appropriate courses of action from the course-of-action library 930 and output the respective incident/course-of-action pairs 940 as course-of-action recommendations.

In step 240 of FIG. 2, for example, the incident triage engine may use machine learning to match incidents to appropriate pre-defined remediation plans. That is, in addition to using pre-defined incident/course-of-action matching techniques, the incident triage engine 910 may employ machine learning to match incidents to appropriate pre-defined remediation plans. An exemplary machine learning system is illustrated in FIG. 10.

Figure 10:
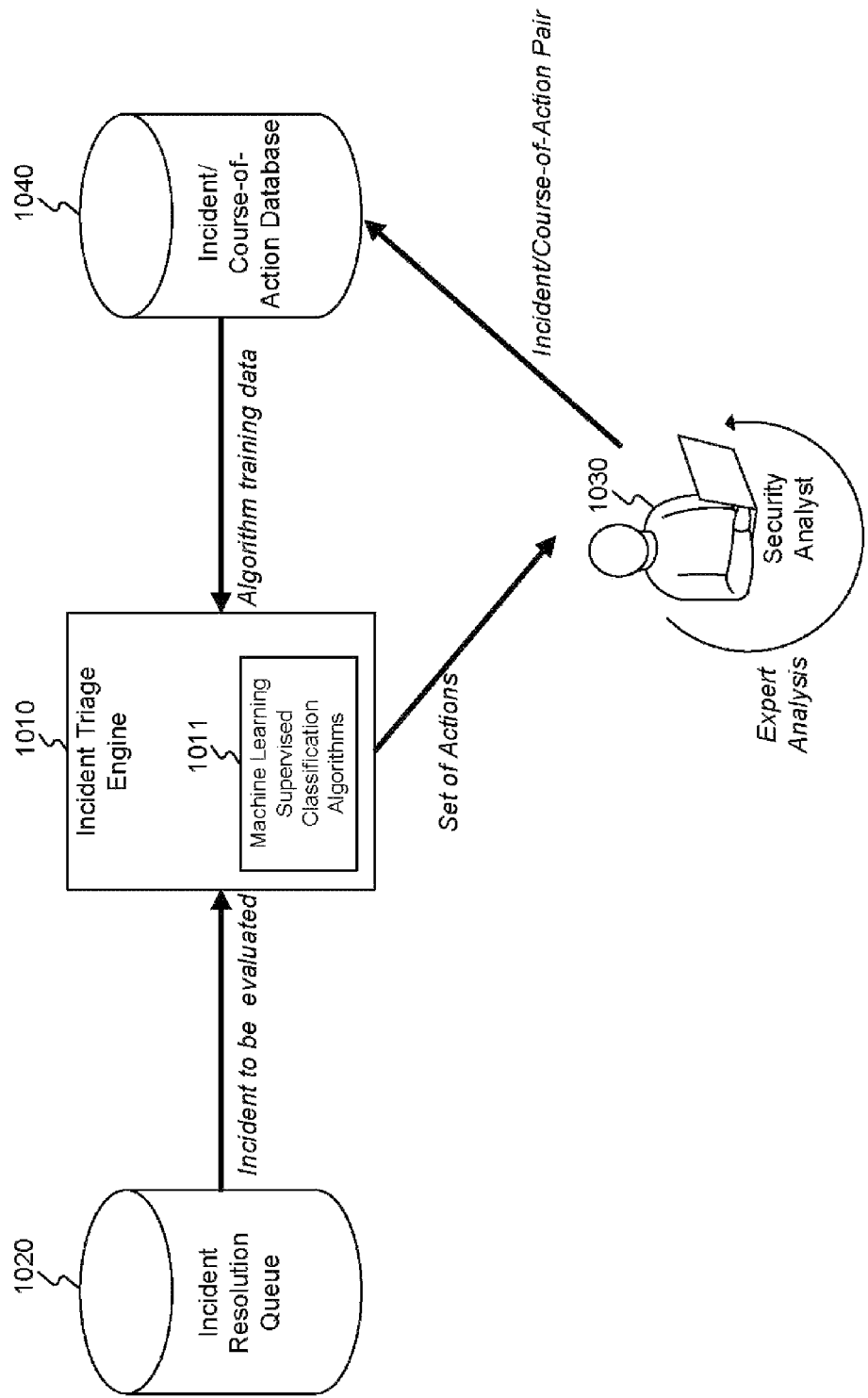
FIG. 10 illustrates machine learning according to an embodiment.

As illustrated in FIG. 10, the incident triage engine 1010 may receive information about the incident to be evaluated from the incident resolution queue 1020. The incident triage engine 1010 may generate a set of actions most likely to be effective against the incident, and output the set of actions. A security analyst 1030 may then receive the set of actions, and analyze the proposed courses of action to select the best course of action to be paired with the incident. The incident/course-of-action pair selected by the security analyst 1030 may then be sent to the incident/course-of-action database 1040. The incident/course-of-action database 1040 may then be updated either automatically or manually by the security analyst 1030 to include the incident/course-of-action pair. The incident/course-of-action pairs in the incident/course-of-action database 1040 may then be made available to the incident triage engine 1010, thus providing algorithm training data to the incident triage engine 1010. The incident triage engine 1010 may include machine learning supervised classification algorithms 1011. The incidents in the incident resolution queue may then be matched with an appropriate course of action.

In step 250 of FIG. 2, after the incidents in the queue are matched with appropriate courses of action, the incident triage engine may optimize the incident priority within the queue based on the remediation time of the incidents in the queue. An exemplary system of optimizing the incident priority within the queue is illustrated in FIG. 11.

Figure 11:
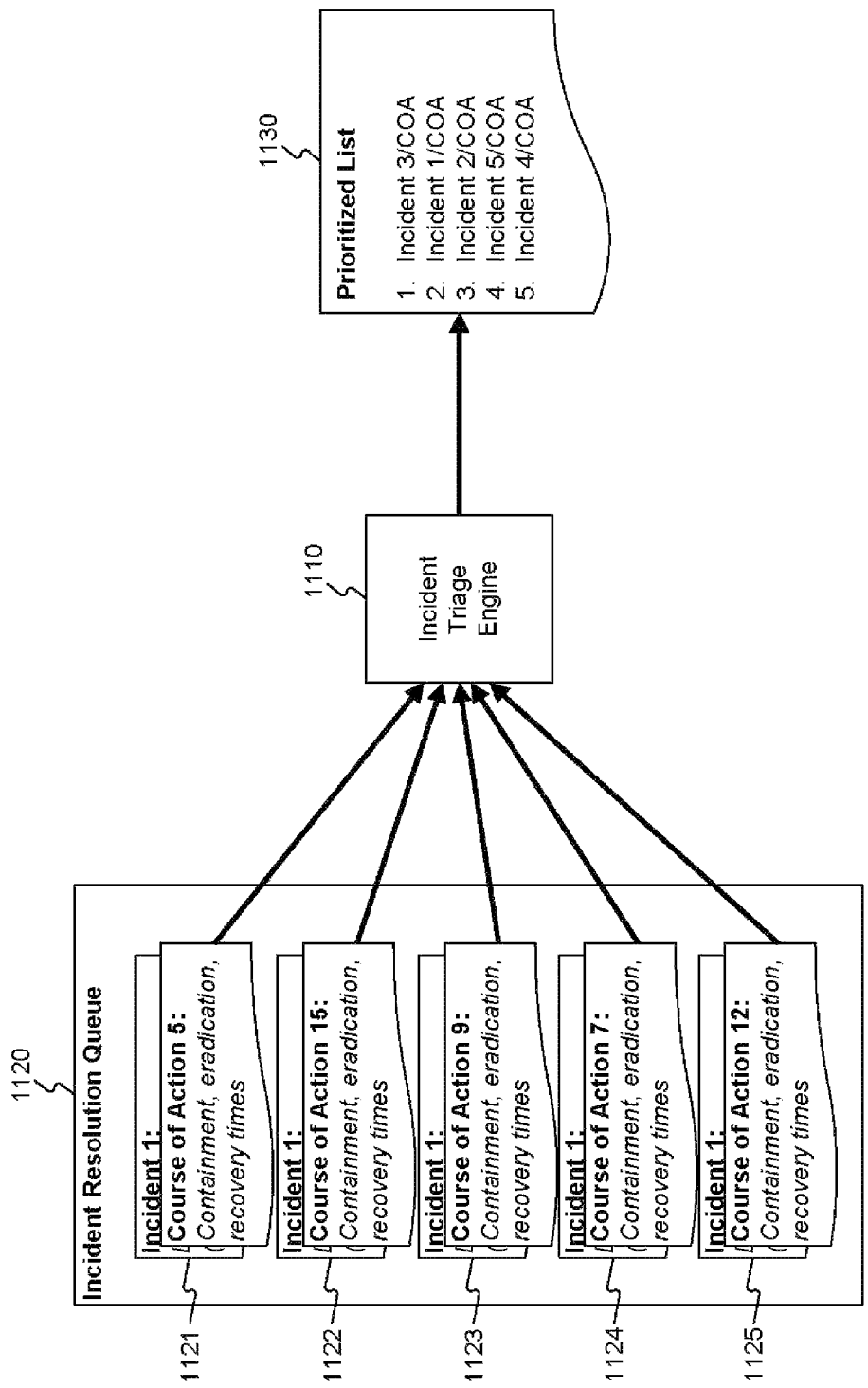
FIG. 11 prioritization of incidents in the incident resolution queue according to an embodiment.

As illustrated in FIG. 11, the incident triage engine 1110 may receive information from the incident resolution queue 1120 regarding the incident/course-of-action pairs 1121-1125 in the incident resolution queue 1120. The incident/course-of-action pairs 1121-1125 stored in the incident resolution queue 1120 may include information regarding certain attributes of the courses of action. The attributes of the courses of action may include an effectiveness attribute that represents the time required to execute key remediation steps. The effectiveness attribute may include the containment time, eradication time, and recovery time for the incident based on the selected course of action.

The containment time refers to the time required to contain the incident. At containment of the incident at an asset, the incident potency becomes zero, and the incident stops spreading to other assets from the asset where the incident is contained. Thus, once contained, the marginal loss due to additional assets becomes zero, as the incident is no longer spreading. The eradication time refers to the time required to eradicate the incident from the asset. Once the incident is eradicated, the incident impact on the asset becomes zero. Thus, once eradicated, the total marginal loss becomes zero, because the incident is no longer causing damage to the assets in the system. The recovery time refers to the time required to restore the value of the asset to the original value of the asset prior to infection by the incident.

Continuing with the example of a web server supporting an e-commerce website, the remediation of a remote exploit may consume more time during the eradication and recovery stages, where the system may have to be re-imaged, the data leakage may have to be identified, and forensics may be gathered. On the other hand, the remediation of a denial-of-service incident may consume more time in the containment stage, where network engineers may work to isolate the denial-of-service traffic, but once the incident is contained, it may also simultaneously be eradicated and recovery completed.

For example, if a computer worm attacked a web server, the containment time would be the amount of time estimated to take the security team to quarantine the web server by taking the server offline. The eradication time would be the amount of time it would take for the team to conduct a forensic investigation on the affected web server and replace the server with an assured clean asset, such as restoring the web server software from a verified system image. The recovery time would be the amount of time it takes the security team to reintroduce the cleaned asset into the environment where it can again be accessed from the network.

Based on the information received from the incident resolution queue 1120, the incident triage engine 1110 may optimize or prioritize the order of the incidents in the incident resolution queue 1120, and output the prioritized list 1130.

A goal of the final optimization or prioritization may be to minimize the total loss to the system over the resolution of all of the incidents present in the incident resolution queue. This optimization step recognizes that remediation activities take time, and that while the system is handling or responding to one incident, the other incidents in the queue may be causing damage and loss to the system. That is, there is an opportunity cost associated with handling a response to one incident over another, and that opportunity cost should be taken into account when prioritizing the response order to the incidents in the queue. An example of the prioritization is described below.

Based on the course-of-action attributes of containment time and eradication time, the cumulative marginal loss forecast for an incident LT(t) may be updated, for example, as follows:

$$LT'(t) = \begin{cases} LT(t) & \text{if } t < t_c \\ LT(t) \mid p = 0 & \text{if } t >= t_c \\ LT(t) \mid I_C, I_I, I_A = 0 & \text{if } t >= t_e \end{cases}$$

where:
LT'(t) represents the updated cumulative marginal loss forecast;
p represents the incident potency;
$I_C$ represents the incident impact on confidentiality;
$I_I$ represents the incident impact on integrity;
$I_A$ represents the incident impact on availability;
$t_c$ represents the time at containment; and
$t_e$ represents the time at eradication.

Using the updated cumulative marginal loss forecast calculations described above, the incident triage engine 1110 may then calculate a total loss for the resolution of all of the incidents within the queue 1120. For example, if there are three incidents in the queue, the total loss for the queue may be calculated as the sum of the loss due to the first incident, the loss due to the second incident (including losses incurred during the remediation of the first incident), and the loss due to the third incident (including losses incurred during the remediation of the first and second incidents). An example of the total loss calculations for the total loss for the resolution of all of the incidents within the queue (Total Queue Loss "TQL") may be as follows:

$$TQL = LT'(R_1)_1 + LT'(R_2+R_1)_2 + \ldots + LT'(R_i + \ldots + R_2 + R_1)_i$$

where:
LT'(t)$_i$ represents the loss function for incident i in the queue; and
$R_i$ represents the restore time for incident i, which may be approximated as $t_c + t_e + t_r$.

As shown in the above formula, the total queue loss TQL for a queue with three incidents may be equal to (1) the updated cumulative marginal loss forecast of the first incident at a time equal to the time required to resolve the first incident; plus (2) the updated cumulative marginal loss forecast of the second incident at a time equal to the time required to resolve the second incident plus the time required to resolve the first incident; plus (3) the updated cumulative marginal loss forecast of the third incident at a time equal to the time required to resolve the third incident plus the time required to resolve the second incident plus the time required to resolve the first incident. The calculation of total queue loss TQL for a queue with i incidents (where i is greater than 3) would continue by adding: (4) the updated cumulative marginal loss forecast of the fourth incident at a time equal to the time required to resolve the first through fourth incidents; (5) the updated cumulative marginal loss forecast of the fifth incident at a time equal to the time required to resolve the first through fifth incidents; and continuing adding the updated cumulative marginal loss forecasts through (i), the updated cumulative marginal loss forecast for the ith incident at a time equal to the time required to resolve the first through ith incidents.

To optimize the order of incidents within the queue, the incident triage engine may calculate total queue losses based on different orderings of the incidents within the incident resolution queue. For example, the incident triage engine may calculate total queue losses for each permutation of orders of the incidents within the incident resolution queue, then select the permutation or ordering of incidents with the lowest total queue loss.

For example, if there are three incidents in the incident resolution queue, the incident triage engine may perform the following total queue loss calculations:

$$LT'(R_1)_1 + LT'(R_2+R_1)_2 + LT'(R_3+R_2+R_1)_3;$$

$$LT'(R_1)_1 + LT'(R_3+R_1)_3 + LT'(R_2+R_3+R_1)_2;$$

$$LT'(R_2)_2 + LT'(R_1+R_2)_1 + LT'(R_3+R_1+R_2)_3;$$

$$LT'(R_2)_2 + LT'(R_3+R_2)_3 + LT'(R_1+R_3+R_2)_1;$$

$$LT'(R_3)_3 + LT'(R_1+R_3)_1 + LT'(R_2+R_1+R_3)_2; \text{ and}$$

$$LT'(R_3)_3 + LT'(R_2+R_3)_2 + LT'(R_1+R_2+R_3)_1.$$

The above calculations represent all six permutations of three incidents within the incident resolution queue. From these calculations, the incident triage engine may select the permutation with the lowest total queue loss, and output the order of the incidents in the prioritized list.

While the above example involves only three incidents in the incident resolution queue, in practice, the incident resolution queue will likely have many more incidents pending in the system. Thus, it may be the case that calculating the total queue loss for every permutation of the incidents within the incident resolution queue becomes impractical, both because the computations required increases exponentially, and because the time it takes to prioritize the queue becomes so long that the benefits of prioritization may be outweighed by the loss from the delay in calculating the optimization. Thus, every possible permutation may not need to be calculated when optimizing the arrangement of incidents within the incident resolution queue. Instead, in some embodiments, it may be considered sufficient to calculate the total queue loss for only a subset of all possible permutations, and perform the optimization by selecting one of the permutations within that subset based on the total queue losses calculated.

As illustrated in step 250 of FIG. 2, the optimization of the incident priority can be performed continuously. That is, once the incident triage engine has selected the optimum arrangement of incidents within the incident resolution queue, the incident triage engine may repeat the optimization step 250, taking into account any changes within the environment such as changes to the asset, incident, environment, or course-of-action attributes. Alternatively, the optimization in step 250 of FIG. 2 may be repeated upon the occurrence of a specific event. Triggers for repeating the optimization may include resolving an incident, the addition of a new incident to the incident resolution queue, significant changes in asset attributes, or a request by a user.

Once the order of incidents in the incident resolution queue has been optimized and prioritized, the optimized and prioritized queue may be output to a security analyst who may then execute remediation according to the queue. Alternatively, the system may initiate and/or execute one or more remediation steps automatically according to optimized and prioritized queue.

Other embodiments of the disclosure will be apparent to those skilled in the art from consideration of the specification and practice of the embodiments disclosed herein. In particular, non-dependent steps may be performed in any order, or in parallel. It is intended that the specification and examples be considered as exemplary only, with a true scope and spirit of the disclosure being indicated by the following claims.

What is claimed is:

1. A method, comprising:
 storing, by a device, a response queue that includes a list of
  a plurality of incidents within a computer network,
  the computer network including a plurality of linked network devices,
  the plurality of incidents including one or more of:
   a denial of service attack,
   a virus,
   a worm,
   a Trojan horse,
   a backdoor, or
   a cookie tracker;
 determining, by the device, a plurality of different arrangements of the plurality of incidents within the list, of the plurality of incidents, included in the response queue, the plurality of different arrangements of the plurality of incidents including all possible arrangements of the plurality of incidents within the list;
 receiving, by the device and for each of the plurality of incidents, a remediation time associated with a course of action for resolving each of the plurality of incidents;
 calculating, by the device and for each of the plurality of incidents, a loss forecast based on a total time to resolve each of the plurality of incidents,
  the total time to resolve each of the plurality of incidents being based on sum of the remediation time of each of the plurality of incidents and remediation times of incidents, of the plurality of incidents, at earlier positions in the list of the plurality of incidents;
 calculating, by the device and for each of the plurality of different arrangements of the plurality of incidents, a cumulative queue loss forecast based on a sum of the loss forecasts calculated for each of the plurality of incidents;
 arranging, by the device, an order of the plurality of incidents within the list included in the response queue according to an arrangement of the plurality of incidents with a smallest cumulative queue loss forecast;
 executing, by the device, a particular course of action associated with a particular incident arranged first in the order of the plurality of incidents within the list included in the response queue; and
 repeating, by the device, the determining the plurality of different arrangements of the plurality of incidents, the calculating the cumulative queue loss forecast, and the arranging the order of the plurality of incidents within the list when a new incident is added to the list of the plurality of incidents or when an incident is removed from the list of the plurality of incidents.

2. The method according to claim 1, wherein the plurality of linked network devices includes one or more of:
 a database server,
 an application server,
 a firewall,
 an intrusion detection system,
 a router,
 a switch,
 a bridge,
 a repeater, or
 an end point device.

3. The method according to claim 1, the method further comprising:
 receiving attributes of the computer network, attributes of the plurality of linked network devices, and attributes of the plurality of incidents; and
 where calculating the cumulative queue loss forecast comprises:
  calculating the cumulative queue loss forecast based on the attributes of the computer network, the attributes of the plurality of linked network devices, and the attributes of the plurality of incidents.

4. The method according to claim 3, wherein machine learning is used to associate each of the plurality of incidents with a course of action for resolving each of the plurality of incidents.

5. The method according to claim 3, the method further comprising:
 executing courses of action, associated with the plurality of incidents, in the order of the plurality of incidents within the list included in the response queue.

6. The method according to claim 3, wherein the determining the plurality of different arrangements of the plurality of incidents, the calculating the cumulative queue loss forecast, and the arranging the order of the plurality of incidents within the list are continuously performed.

7. The method according to claim 3, wherein:
the attributes of the computer network include an environmental factors attribute;
the attributes of the plurality of incidents include one or more of an incident morbidity attribute or an incident infectiousness attribute,
where the incident morbidity attribute includes one or more of a confidentiality impact of an incident, an integrity impact of an incident, an availability impact of an incident, a progression speed of an incident, or an incubation time of an incident, and
where the incident infectiousness attribute includes one or more of a potency of an incident, a transmission mode of an incident, or a latency period of an incident; and
the attributes of the plurality of linked network devices include one or more of a value attribute or an immunity attribute,
where the value attribute includes one or more of a confidentiality value of a network device, an integrity value of a network device, an availability value of a network device, or a substitutability value of a network device, and
where the immunity attribute includes a susceptibility value of a network device.

8. The method according to claim 7, wherein the incident infectiousness attribute includes a value identifying an ability of an incident to spread to the plurality of linked network devices of the computer network.

9. The method according to claim 7, wherein:
the environmental factors attribute includes a value identifying an ability of the computer network to limit a spread of incidents to the plurality of linked network devices.

10. A non-transitory computer-readable storage medium storing instructions, the instructions comprising:
one or more instructions which, when executed by at least one processor, cause the at least one processor to:
store a response queue that includes a list of a plurality of incidents within a computer network,
the computer network including a plurality of linked network devices,
the plurality of incidents including one or more of:
a denial of service attack,
a virus,
a worm,
a Trojan horse,
a backdoor, or
a cookie tracker;
determine a plurality of different arrangements of the plurality of incidents within the list, of the plurality of incidents, included in the response queue,
the plurality of different arrangements of the plurality of incidents including all possible arrangements of the plurality of incidents within the list;
receive, for each of the plurality of incidents, a remediation time associated with a course of action for resolving each of the plurality of incidents;
calculate, for each of the plurality of incidents, a loss forecast based on a total time to resolve each of the plurality of incidents,
the total time to resolve each of the plurality of incidents being based on sum of the remediation time of each of the plurality of incidents and remediation times of incidents, of the plurality of incidents, at earlier positions in the list of the plurality of incidents;
calculate, for each of the plurality of different arrangements of the plurality of incidents, a cumulative queue loss forecast based on a sum of the loss forecasts calculated for each of the plurality of incidents;
arrange an order of the plurality of incidents within the list included in the response queue according to an arrangement of the plurality of incidents with a smallest cumulative queue loss forecast;
execute a particular course of action associated with a particular incident arranged first in the order of the plurality of incidents within the list included in the response queue; and
repeat the determining the plurality of different arrangements of the plurality of incidents, the calculating the cumulative queue loss forecast, and the arranging the order of the plurality of incidents within the list when a new incident is added to the list of the plurality of incidents or when an incident is removed from the list of the plurality of incidents.

11. The computer-readable storage medium according to claim 10, wherein the plurality of linked network devices includes one or more of:
a database server,
an application server,
a firewall,
an intrusion detection system,
a router,
a switch,
a bridge,
a repeater, or
an end point device.

12. The computer-readable storage medium according to claim 10, further comprising:
one or more instructions which, when executed by the at least one processor, cause the at least one processor to:
receive attributes of the computer network, attributes of the plurality of linked network devices, and attributes of the plurality of incidents; and
the one or more instructions that cause the at least one processor to calculate the cumulative queue loss forecast include:
one or more instructions that cause the at least one processor to calculate the cumulative queue loss forecast based on the attributes of the computer network, the attributes of the plurality of linked network devices, and the attributes of the plurality of incidents.

13. The computer-readable storage medium according to claim 12, wherein machine learning is used to associate each of the plurality of incidents with a course of action for resolving each of the plurality of incidents.

14. The computer-readable storage medium according to claim 12, further comprising:
one or more instructions which, when executed by the at least one processor, cause the at least one processor to:
execute courses of action, associated with the plurality of incidents, in the order of the plurality of incidents within the list included in the response queue.

15. The computer-readable storage medium according to claim 12, further comprising:
one or more instructions which, when executed by the at least one processor, cause the at least one processor to:
continuously perform the determining the plurality of different arrangements of the plurality of incidents, the calculating the cumulative queue loss forecast, and the arranging the order of the plurality of incidents within the list.

16. The computer-readable storage medium according to claim 12, wherein:
the attributes of the computer network include an environmental factors attribute;
the attributes of the plurality of incidents include one or more of an incident morbidity attribute or an incident infectiousness attribute,
where the incident morbidity attribute includes one or more of a confidentiality impact of an incident, an integrity impact of an incident, an availability impact of an incident, a progression speed of an incident, or an incubation time of an incident, and
where the incident infectiousness attribute includes one or more of a potency of an incident, a transmission mode of an incident, or a latency period of an incident; and
the attributes of the plurality of linked network devices include one or more of a value attribute or an immunity attribute,
where the value attribute includes one or more of a confidentiality value of a network device, an integrity value of a network device, an availability value of a network device, or a substitutability value of a network device, and
where the immunity attribute includes a susceptibility value of a network device.

17. The computer-readable storage medium according to claim 16, wherein the incident infectiousness attribute includes a value identifying an ability of an incident to spread to the plurality of linked network devices of the computer network.

18. The computer-readable storage medium according to claim 16, wherein:
the environmental factors attribute includes a value identifying an ability of the computer network to limit a spread of incidents to the plurality of linked network devices.

19. A system, comprising:
one or more devices to:
store a response queue that includes a list of a plurality of incidents within a computer network,
the computer network including a plurality of linked network devices,
the plurality of incidents including one or more of:
a denial of service attack,
a virus,
a worm,
a Trojan horse,
a backdoor, or
a cookie tracker;
determine a plurality of different arrangements of the plurality of incidents within the list, of the plurality of incidents, included in the response queue,
the plurality of different arrangements of the plurality of incidents including all possible arrangements of the plurality of incidents within the list;
receive, for each of the plurality of incidents, a remediation time associated with a course of action for resolving each of the plurality of incidents;
calculate, for each of the plurality of incidents, a loss forecast based on a total time to resolve each of the plurality of incidents,
the total time to resolve each of the plurality of incidents being based on sum of the remediation time of each of the plurality of incidents and remediation times of incidents, of the plurality of incidents, at earlier positions in the list of the plurality of incidents;
calculate, for each of the plurality of different arrangements of the plurality of incidents, a cumulative queue loss forecast based on a sum of the loss forecasts calculated for each of the plurality of incidents;
arrange an order of the plurality of incidents within the list included in the response queue according to an arrangement of the plurality of incidents with a smallest cumulative queue loss forecast;
execute a particular course of action associated with a particular incident arranged first in the order of the plurality of incidents within the list included in the response queue; and
repeat the determining the plurality of different arrangements of the plurality of incidents, the calculating the cumulative queue loss forecast, and the arranging the order of the plurality of incidents within the list when a new incident is added to the list of the plurality of incidents or when an incident is removed from the list of the plurality of incidents.

20. The system according to claim 19, wherein the plurality of linked network devices includes one or more of:
a database server,
an application server,
a firewall,
an intrusion detection system,
a router,
a switch,
a bridge,
a repeater, or
an end point device.

21. The system according to claim 19, where the one or more devices are further to:
receive attributes of the computer network, attributes of the plurality of linked network devices, and attributes of the plurality of incidents; and
when calculating the cumulative queue loss forecast, the one or more devices are to:
calculate the cumulative queue loss forecast based on the attributes of the computer network, the attributes of the plurality of linked network devices, and the attributes of the plurality of incidents.

22. The system according to claim 21, wherein machine learning is used to associate each of the plurality of incidents with a course of action for resolving each of the plurality of incidents.

23. The system according to claim 21, where the one or more devices are further to:
execute courses of action, associated with the plurality of incidents, in the order of the plurality of incidents within the list included in the response queue.

24. The system according to claim 21, wherein the determining the plurality of different arrangements of the plurality of incidents, the calculating the cumulative queue loss forecast, and the arranging the order of the plurality of incidents within the list are continuously performed.

25. The system according to claim 24, wherein:
the attributes of the computer network include an environmental factors attribute;
the attributes of the plurality of incidents include one or more of an incident morbidity attribute or an incident infectiousness attribute,
where the incident morbidity attribute includes one or more of a confidentiality impact of an incident, an integrity impact of an incident, an availability impact of an incident, a progression speed of an incident, or an incubation time of an incident, and where the incident infectiousness attribute includes one or more of a potency of an incident, a transmission mode of an incident, or a latency period of an incident; and the attributes of the plurality of linked network devices include one or more of a value attribute or an immunity attribute, where the value attribute includes one or more of a confidentiality value of a network device, an integrity value of a network device, an availability value of a network device, or a substitutability value of a network device, and where the immunity attribute includes a susceptibility value of a network device.

26. The system according to claim 25, wherein the incident infectiousness attribute includes a value identifying an ability of an incident to spread to the plurality of linked network devices of the computer network.

27. The system according to claim 25, wherein:
the environmental factors attribute includes a value identifying an ability of the computer network to limit a spread of incidents to the plurality of linked network devices.

* * * * *